United States Patent

Porsche et al.

[15] 3,647,258

[45] Mar. 7, 1972

[54] PASSENGER CAR WITH A ROLL YOKE

[72] Inventors: Ferdinand Anton Ernst Porsche, Stuttgart-Nord; Rainer Srock, Leinfelden, both of Germany

[73] Assignee: Firma Dr.-Ing. h.c.F. Porsche KG, Stuttgart-Zuffenhausen, Germany

[22] Filed: Oct. 24, 1969

[21] Appl. No.: 869,046

[30] Foreign Application Priority Data

Nov. 14, 1968 Germany..................P 18 08 786.0

[52] U.S. Cl..................296/102, 280/150 C, 296/137 R
[51] Int. Cl..................................................B62d 25/06
[58] Field of Search..............296/102, 28, 137; 280/150 C

[56] References Cited

UNITED STATES PATENTS 2,271,310  1/1942  Schäfer........................296/28
3,494,659  2/1970  Trenkler......................296/137
3,526,428  9/1970  Porsche et al..............280/150 X Primary Examiner—Benjamin Hersh
Assistant Examiner—Winston H. Douglas
Attorney—Craig, Antonelli & Hill

[57] ABSTRACT

An automotive vehicle, especially a passenger car, with sidewalls which are disposed beneath the belt line and consist of inner and outer pressed-out parts. The sidewalls are provided with extensions above the belt line and are integral with the sidewalls. These extensions form the upright sections of the roll yoke. In particular, the outer pressed-out parts are equipped with extensions which form the outer wall of the roll yoke. The inner pressed-out parts are provided with extensions forming the inner wall of the roll yoke. The roll yoke is thus constructed as a box girder and has an additional pressed-out reinforcing member with pressed-out portions arranged within the box girder and extending over the entire height of the roll yoke.

4 Claims, 5 Drawing Figures

PATENTED MAR 7 1972 3,647,258

Inventors
FERDINAND ANTON ERNST PORSCHE
AND RANIER SROCK
BY Craig, Antonelli, Stewart & Hill
Attorneys Inventors
FERDINAND ANTON ERNST PORSCHE and XANIER SROCK BY Craig, Antonelli, Stewart & Hill
Attorneys

PASSENGER CAR WITH A ROLL YOKE

BACKGROUND OF THE INVENTION

The present invention relates to a passenger car with sidewalls, and more particularly to a passenger car with sidewalls that are disposed beneath the belt line and consisting of inner and outer pressed-out parts. The passenger car according to the present invention is also provided with a roll yoke spanning the passenger compartment in a free-standing manner and being constructed as a box girder.

The roll yokes of passenger cars must meet the requirement of having a rugged construction in order to absorb large loads, and therefore the roll yoke must be structurally connected with the superstructure. In conventional passenger cars of this type, the walls of the superstructure and of the roll yoke are separate pressed-out parts which are connected with each other at the level of the belt line during the manufacture of the vehicle. However, this arrangement has the disadvantage that complicated and therefore expensive welding operations are required for joining these structural components. Also, difficulties are encountered in compensating for the manufacturing tolerances when these pressed-out parts are joined together.

SUMMARY OF THE INVENTION

It is the aim of the present invention to increase in a simple manner the ruggedness and stability of the transition zones of the roll yoke and to improve the assembly of these components of the superstructure.

The underlying problems are solved in accordance with the present invention by providing the sidewalls with extensions that are integral with the sidewalls and extend above the belt line. These extensions form the upright sections of the roll yoke. For this purpose, the outer pressed-out parts are equipped with extensions which constitute the outer wall of the roll yoke. At the same time, the inner pressed-out parts of the sidewalls can also be provided with extensions which form the inner wall of the roll yoke.

It is of further advantage to arrange an additional pressed-out reinforcing member within the box girder of the roll yoke formed by the extensions of the sidewalls. This reinforcing member preferably extends over the entire height of the upright sections of the roll yoke which are formed by the extensions. It is also of great advantage to provide the reinforcing member with local bulges or protuberances which cooperate with the inner pressed-out part.

In accordance with the present invention, there is provided a roll yoke with upright sections that are integral with the sidewalls of the vehicle and thereby represent an organic joint with these parts of the superstructure.

Accordingly, it is an object of the present invention to increase in a simple manner the ruggedness and stability of a roll yoke.

Another object of the present invention is to improve the assembly of the parts which constitute the roll yoke.

A further object of the present invention is to provide a construction whereby difficult welding operations are eliminated.

A still further object of the present invention resides in the fact that manufacturing tolerances of the upright sections and of a crosspiece of the roll yoke extending above the passenger compartment are more simply compensated for during the assembly of these structural components.

BRIEF DESCRIPTION OF THE DRAWINGS

These and further objects, features and advantages of the present invention will become more apparent from the following description when taken in connection with the accompanying drawings which show, for purposes of illustration only, an embodiment in accordance with the present invention, and wherein.

DETAILED DESCRIPTION OF THE DRAWINGS

Figure 1:
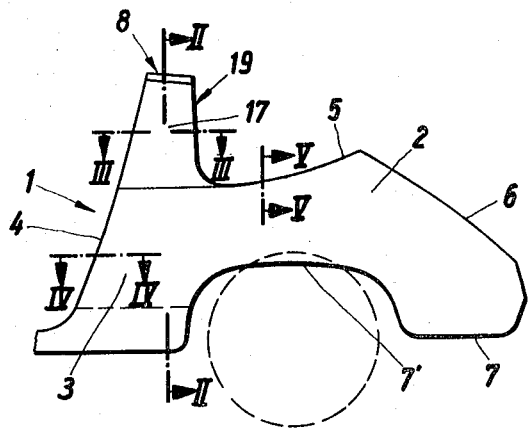
FIG. 1 is a side view of the rear zone of a passenger car.

Referring now to the drawings, and in particular, to FIG. 1, the rear portion of the passenger car 1 is illustrated in this figure. The rear portion includes a strong and rigid superstructure 2 having oppositely disposed sidewalls 3. The sidewall 3 is defined by a lock column wall 4, which forms a part of the door opening, and has boundary edges 5, 6, 7 extending toward the end portion of the vehicle 1. In the region of the rear axle, a wheel cutout 7' is provided in the sidewall 3. A roll yoke girder generally designated by reference numeral 8 which spans the passenger space or compartment of the automotive vehicle in a freestanding manner is provided above and below the belt line of the sidewall 3, the belt line being in the area of an extension of the boundary edge 5 in the arrangement of FIG. 1.

Figure 2:
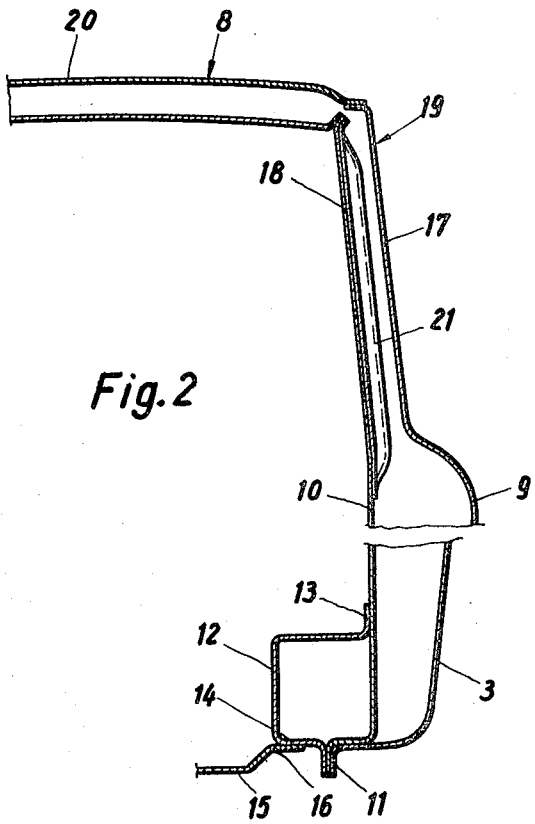
FIG. 2 is a partial sectional view along line II—II of FIG. 1.

As shown in FIG. 2, the sidewall 3 comprises an outer pressed-out part 9 and an inner molded part 10 which are connected to each other by means of flanges 11 and simultaneously are mounted to a longitudinal girder or beam 12 which is supported with its bent-over edge portion 13 at the inner panel 10 and is connected with the latter by conventional connecting means such as, for example, spot welding. A bottom plate 15 with portion 16 is extended up to the longitudinal girder 12 at point 14 is attached at that point by spot welding.

Above the belt line of the sidewall, the outer pressed-out part 9 has an extension 17 and the inner pressed-out part 10 has an extension 18. The extension 17 of the outer pressed-out part 9 and the extension 18 of the inner pressed-out part 10 are produced as integral pressed-out components and form the upright section generally designated by reference numeral 19 of the roll yoke 8. A crosspiece 20 cooperates with the free end of the upright section 19 of the roll yoke. The crosspiece 20 extends above the passenger space and connects the upright section 19 with the corresponding upright section of the opposite sidewall.

Figure 3:
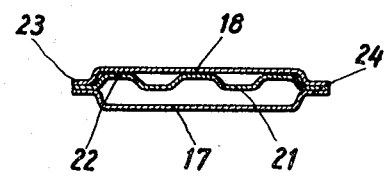
FIG. 3 is a sectional view along line III—III of FIG. 1.

As seen in FIG. 3, the extensions 17, 18 of the outer and inner pressed-out parts of the sidewall 3 are connected together into a box girder. The box girder contains a pressed-out reinforcing member 21 which extends over the entire height of the upright section 18 and is locally provided with pressed-out portions or protuberances 22. These pressed-out portions 22 of the reinforcing member 21 are connected with the extension 18 of the inner sheet metal panel 10 by conventional connecting means such as, for example, spot welding. It is also possible to provide indentations at the extension 18 as well as at the reinforcing member 21. The parts 17, 18 and 21 forming the box girder are connected with one another along spot welding flanges 23, 24.

Figure 4:
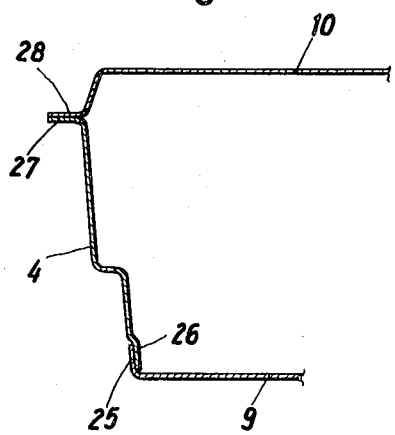
FIG. 4 is a sectional view along line IV—IV of FIG. 1.

In FIG. 4, one possible construction of the connection of the outer pressed-out part 9 and the inner pressed-out part 10 with the lock column 4 is illustrated. According to FIG. 4, the outer pressed-out part 9 is provided with a flange 25 which is connected with a shoulder or offset 26 of the lock column wall 4. The lock column wall 4 and the inner pressed-out part 10 have bent edge portions 27, 28 at which they are connected with each other by conventional connecting means such as, for example, spot welding.

Figure 5:
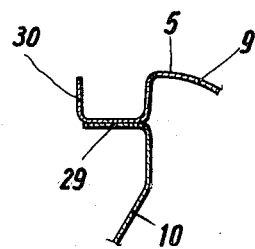
FIG. 5 is a sectional view along line V—V of FIG. 1.

The connection of the inner pressed-out part 10 with the outer pressed-out part 9 in a zone along the boundary edge 5 is illustrated in FIG. 5. The inner pressed-out part 10 is provided with an abutment section 29 on which a U-shaped edge portion 30 of the outer pressed-out part 9 is disposed. The abutment section 29 of the inner pressed-out part 10 and the edge portion 30 are connected with each other by conventional means such as, for example, welding and, optionally, also in a detachable manner.

While we have shown and described only one embodiment in accordance with the present invention, it is understood that the same is not limited thereto but is susceptible of numerous changes and modifications as known to a person skilled in the art, and we, therefore, do not wish to be limited to the details shown and described herein but intend to cover all such changes and modifications as encompassed by the scope of the present invention.

We claim:

1. Automotive vehicle having sidewalls located beneath the belt line thereof and consisting of an inner part and an outer part, said parts being provided with extension means extending above said belt line and being integral therewith, a roll yoke spanning a passenger compartment, said extension means and the sidewalls forming the upright sections of said roll yoke whereby said roll yoke is free standing, said roll yoke being constructed as a box girder and having reinforcing means therein, said reinforcing means being provided with bulges extending from said inner part and running substantially along the entire height of said extension means.

2. Automotive vehicle according to claim 1, wherein said reinforcing means is a pressed-out reinforcing member.

3. Automotive vehicle according to claim 1, wherein said inner part is a pressed-out part.

4. Automotive vehicle according to claim 1, wherein said outer part is a pressed-out part.

* * * * *